Oct. 9, 1934.   W. D. ARCHEA   1,976,106
MACHINE TOOL
Filed Oct. 26, 1931   5 Sheets-Sheet 1

Inventor
WALTER D. ARCHEA
By AHK Parsons
Attorney

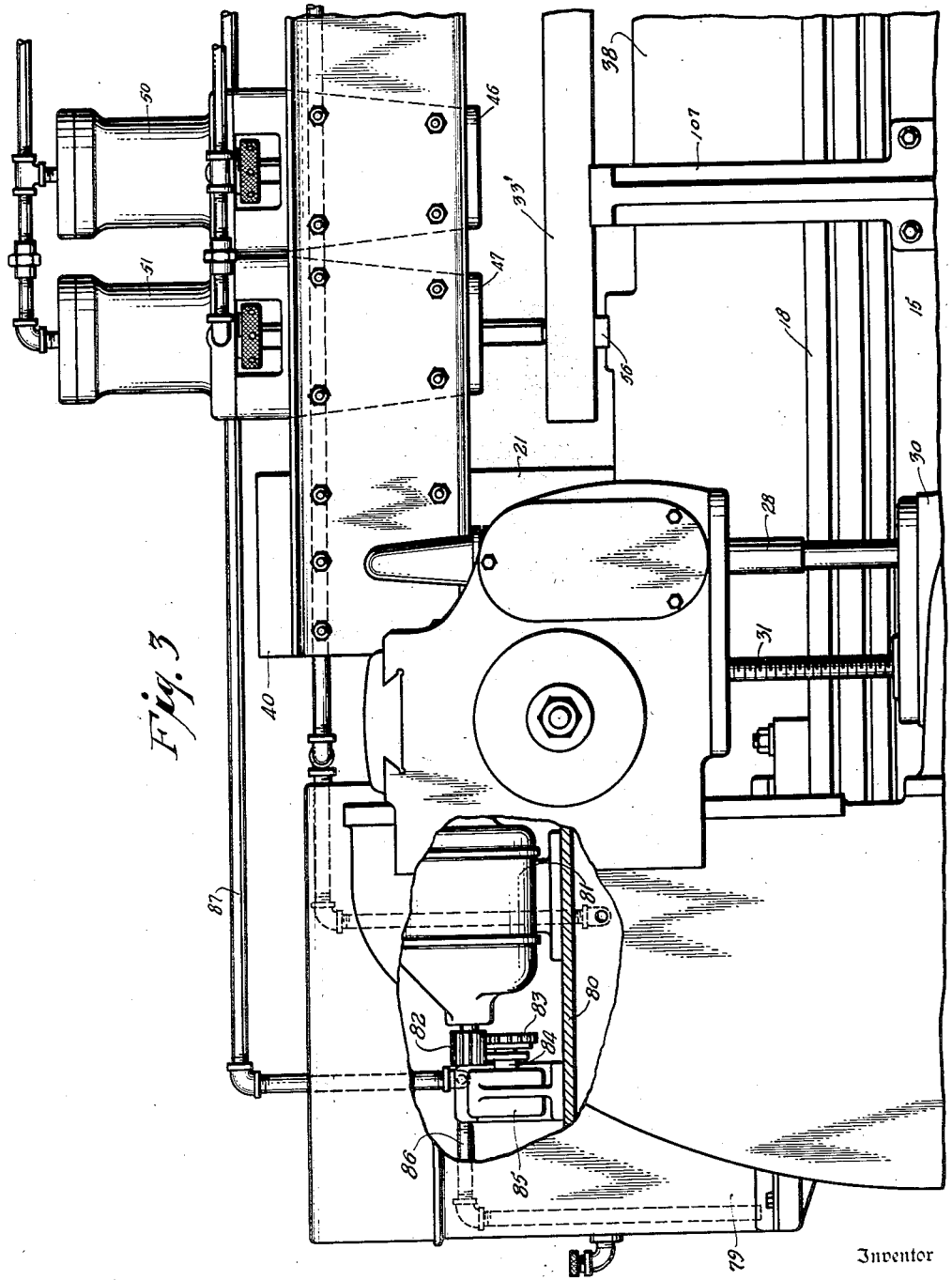

Oct. 9, 1934. W. D. ARCHEA 1,976,106
MACHINE TOOL
Filed Oct. 26, 1931 5 Sheets-Sheet 4

Inventor
WALTER D. ARCHEA
By
Attorney

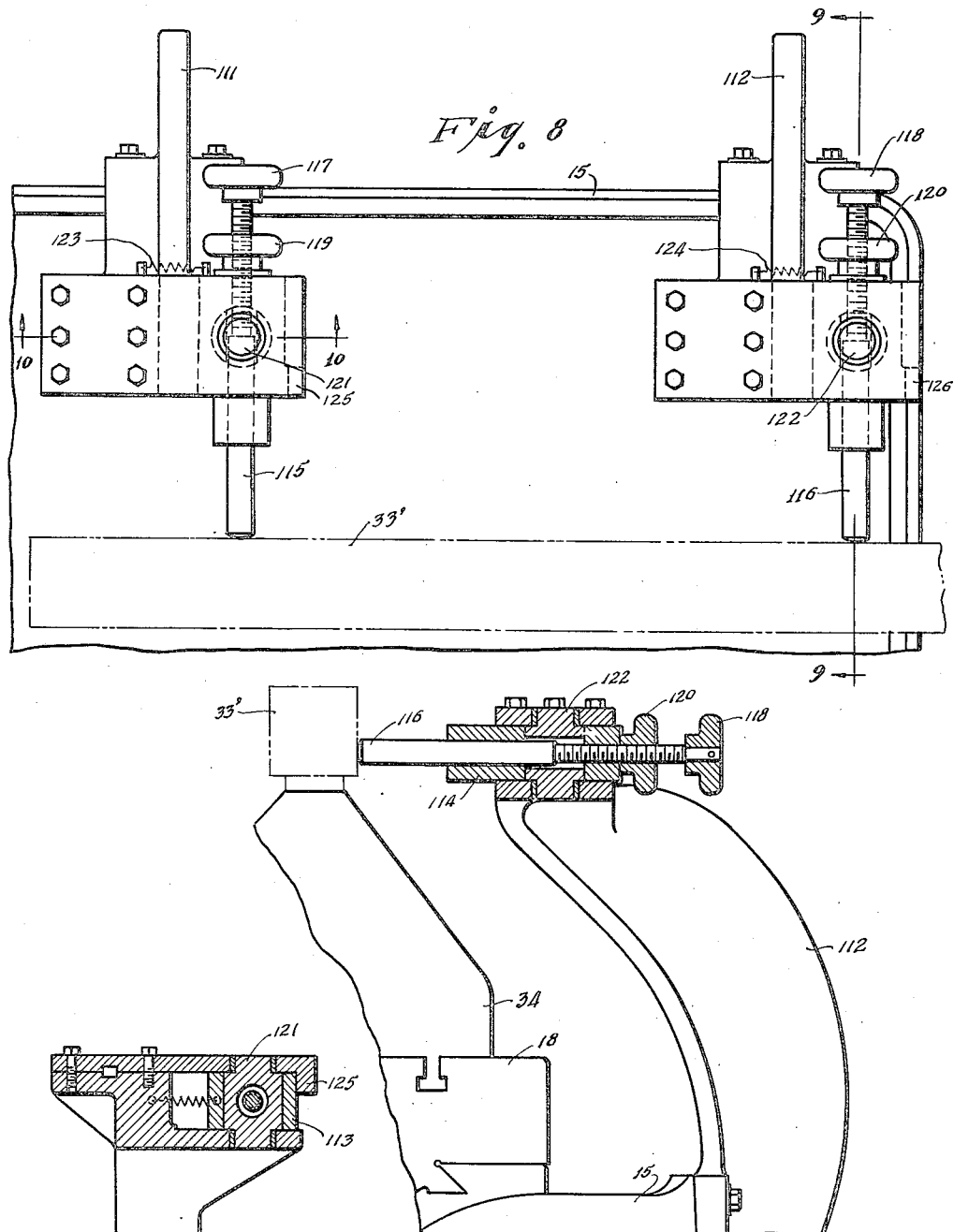

Patented Oct. 9, 1934

1,976,106

UNITED STATES PATENT OFFICE 1,976,106

MACHINE TOOL

Walter D. Archea, Cincinnati, Ohio, assignor to The Cincinnati Milling Machine Company, Cincinnati, Ohio, a corporation of Ohio Application October 26, 1931, Serial No. 571,041

9 Claims. (Cl. 90—58)

This invention relates to improvements in machine tools and especially to improvements in a milling machine.

An object of the invention is the provision of a milling machine adapted for simultaneously straightening work and milling portions thereof.

Another object of the invention is the provision of a machine tool adapted for aligning faces of comparatively heavy stiff material with the cutter of the machine tool so that a true cut may be had on the work.

A further object of the invention is the provision of improved hydraulic work clamping and straightening mechanism for permanently removing the bow or bend in copper or brass billets and for scalping or removing the outer skin of said billets while held in the straightened position.

Other objects and advantages of the present invention should be readily apparent by reference to the accompanying drawings forming a part thereof and described in the following specification, and it is to be understood that any modifications may be made in the exact structural details there shown and described within the scope of the appended claims without departing from or exceeding the spirit of the invention.

In the drawings:

Figure 2 is a fragmentary elevational view showing the work supporting and straightening mechanism in one position relative to the bed.

Figure 3 is a fragmentary elevational view showing the work supporting and straightening mechanism in a second position relative to the bed.

Figure 8 is a fragmentary planned view of the positioning stop forming a detail of the invention.

Figure 9 is a sectional view taken on line 9—9 of Figure 8.

Figure 10 is a sectional view taken on line 10—10 of Figure 8.

Throughout the several views of the drawings, similar reference characters are employed to denote the same or similar parts.

Figure 1:
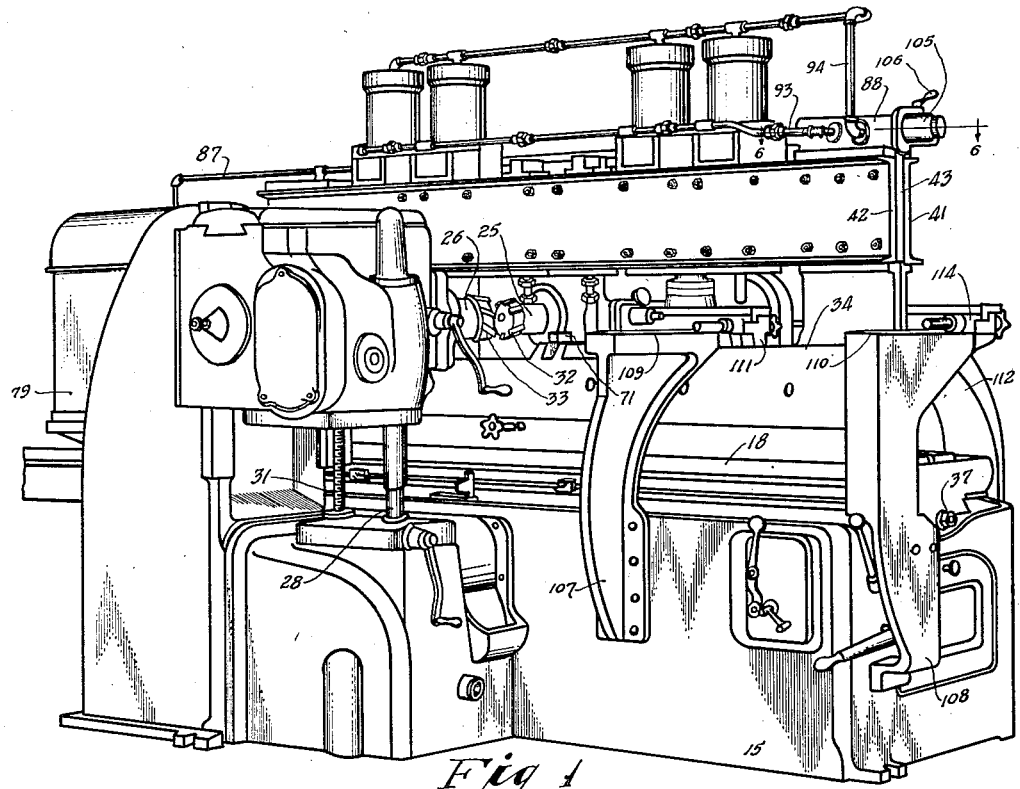
Figure 1 is a perspective view of a milling machine embodying the improvements of this invention.
Figure 6:
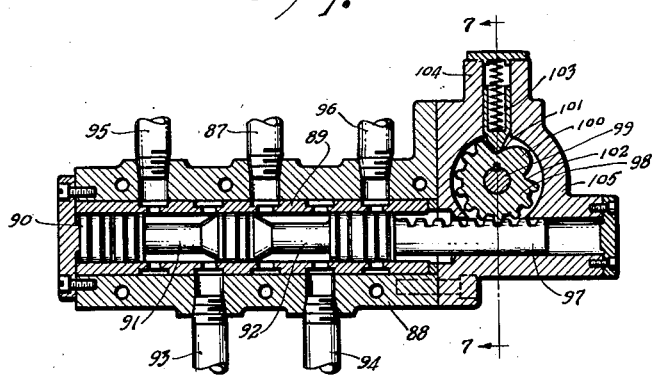
Figure 6 is a sectional view taken on the line 6—6 of Figure 1.
Figure 7:
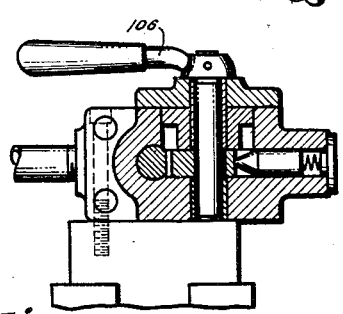
Figure 7 is a sectional view taken on the line 7—7 of Figure 6.

Copper and brass wire, sheets and other drawn or rolled articles are made from billets cast by well-known processes. These billets in the finished state have an outer skin of comparatively dense texture and frequently have foreign particles lodged in the outer surface. In the past it has been customary to roll and then draw copper wire from these billets but it has been found that the dirt, foreign matter and scales, of which this outer skin is composed, would weaken the said wire at the point where it was embedded. In order to avoid this difficulty, the billets are now scalped or skinned by milling machine cutters so that nothing but pure, clean copper is now employed in their manufacture.

A machine for effecting this scalping of the billets may comprise a base or bed 15 having formed on its upper surface a dove-tailed guideway 16 receiving the correspondingly formed guide 17 depending from the under-surface of a table 18. The bed or base has secured to its opposite sides columns 19 and 20 each formed on one side with guideways 21 and 22. Received by the guideways 21 and 22 are heads or spindle carriers 23 and 24 respectively rotatably supporting a spindle 25 and 26. The spindles are respectively driven by a shaft inclosed within the telescoping guards 27 and 28 which respectively terminate within gear boxes 29 and 30 where they are connected with a suitable power source or gear train.

Driven also from within said gear boxes are the screws 31, one for each of the heads 23 and 24 for effecting their vertical movement relative to the columns 19 and 20.

Secured to the nose of the spindles 25 and 26 are the milling cutters 32 and 33 adated to operate on opposite sides of the work piece or billet 33' carried by the work supporting member 34 which is secured in any desirable manner to the table 18. The table 18 is adapted to be translated relative to the bed 15 by means of an hydraulically actuated piston contained within the cylinder 35 carried by the bed 15 and having a piston rod 36 extending therefrom and connected by means of a nut or the like 37 to the table 18.

The work supporting fixture 34 comprises a base 38 having uprights 39 and 40 at opposite ends, to the opposite faces of which are respectively secured channel irons 41 and 42. The channel irons 41 and 42 are mounted with their plane faces opposed to one another to form a passage 43 therebetween. The channel irons 41 and 42 have secured to them within the passage 43 brackets 44, 45, 46 and 47 respectively, supporting on their upper ends cylinders 48, 49, 50 and 51. The cylinders 48 and 51 each inclose a piston 52 while cylinders 49 and 50 each respectively inclose a similar piston 53. The pistons 52 have extending therefrom a piston rod 54 which extends through and beyond the brackets 44 and 47 into engagement with the work 33'. Directly beneath the piston rods 54, the base 38 is provided with fixed blocks or anvils 55 and 56. The piston rods 54 hold the work against the blocks or fixed anvils 55 and 56 during the milling operation and establish the lower level points of the billets.

The pistons 53, within the cylinders 49 and 50, each have extending from it a piston rod 57 having at the lower end a tongue and slot connection 58 with a plunger 59 guided in its vertical movements by means of the brackets 45 and 46. The plungers 59 are each formed in their opposed faces with a notch 60 receiving the ball ends 61 of levers 62. The levers 62 are pivoted at their other ends 63 to the channel irons 41 and 42 by means of a pivot 64. Intermediate their ends, the levers 62 are provided with an enlarged portion 65 received in an aperture 66 formed centrally of pressure plungers 67. The plungers 67 each have threaded into its lower end a screw 68 having a head 69 and a lock nut 70 carried thereby locks the screw in adjusted positions relative to the plungers 67.

Figure 4:
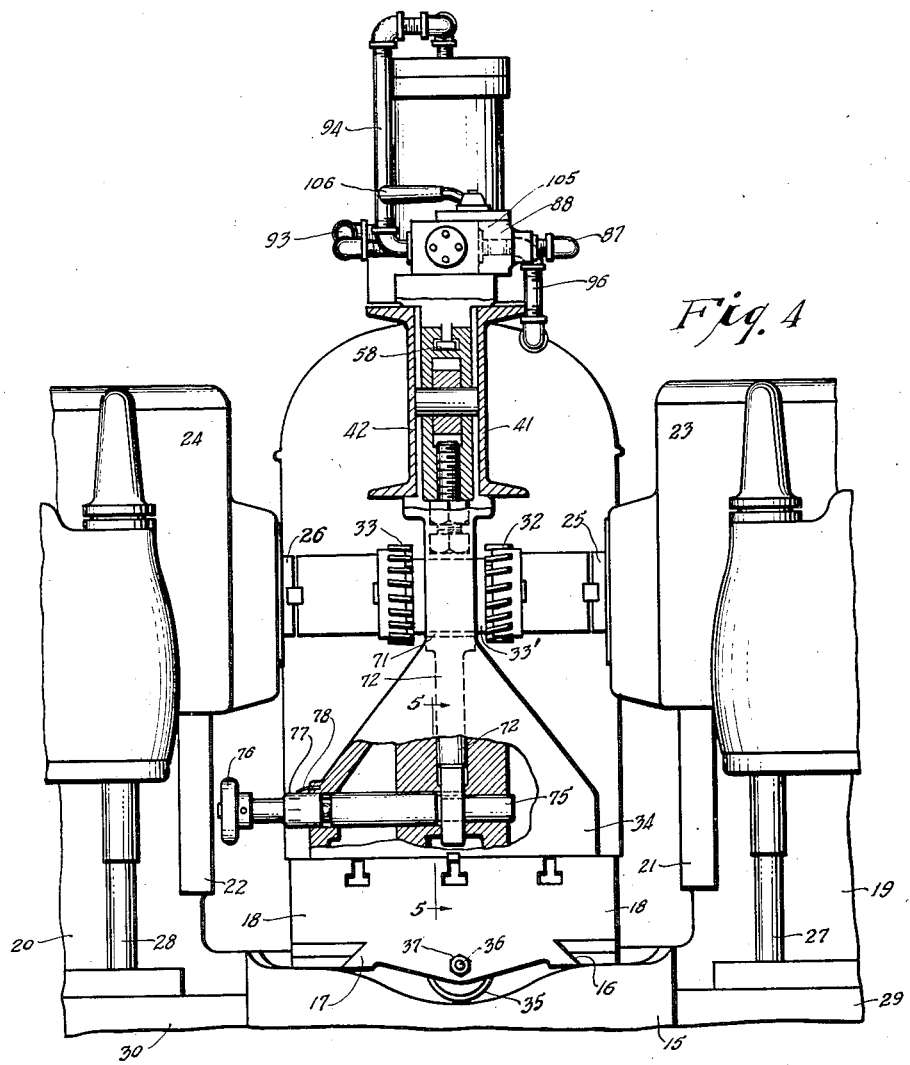
Figure 4 is a fragmentary end elevational view of the machine illustrated in Figure 1, certain parts being removed and others being shown in cross section to more clearly illustrate the invention.
Figure 5:
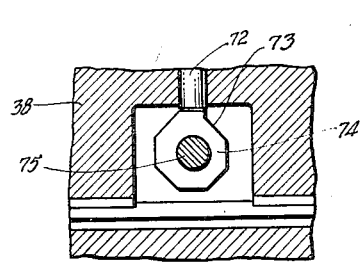
Figure 5 is a fragmentary sectional view taken on the line 5—5 of Figure 4.
Figure 11:
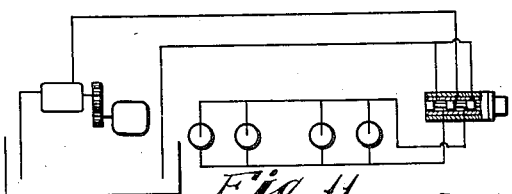
Figure 11 is a diagrammatic view of the hydraulic circuit involved in the invention.

By reference to Figure 2 it will be noted that the pressure plungers are positioned on opposite sides of the center of the length of the work or billets 33'. At substantially the central point the base 38 of the work straightening and carrying mechanism is provided with a shiftable anvil 71 which is carried on the upper end of a vertically shiftable rod 72. The lower end of shiftable rod 72 abuts with one of a plurality of seats or faces 73 on cam member 74 secured in any desirable manner to a shaft 75 journaled in the walls of the base 38. As seen in Figure 4 the shaft 75 terminates on the forward side of said base and is provided with a hand wheel or knob 76 whereby it is actuated. The shaft 75 is also provided at a point outside of the base 38 with graduations 77 cooperating with a pointer 78 carried by the walls of the bracket 34 for indicating the particular seat 73 that is aligned with the plungers 72 and thereby controlling the height of the movable anvil 71.

As was noted above, the pistons for clamping and straightening the work are hydraulically actuated. The work or billet in its rough state and when first introduced into the machine is bowed from end to end and it is mounted on the anvils 55 and 56 with the high point of the bow upwardly toward the pressure plunger heads 69. Before introducing the billet to the machine, the amount of bend or bow in the billet was noted and the adjustable anvil 71 adjusted to the desired seat 73 corresponding with the said amount of bend or bow, said seat positioning the anvil sufficiently below the plane of anvils 55 and 56 that the pressure from plungers 69 will cause sufficient negative bending that upon retraction of the plungers and on account of the spring or resilience of the material the work piece will assume a normal straight condition. After one pair of sides have been milled, it is necessary to reset anvil 71 to the plane of anvils 55 and 56 so that when the piece is turned to mill the other pair of faces, the straight milled bottom face will be supported on anvils all lying in the same plane, thus preventing rebending or bowing of the work when subsequently clamped. The pressure is then introduced behind the pistons whereupon the work is first clamped between piston rods 54 and fixed anvils 55 and 56 and then the pressure plunger heads 69 engage with the work forcing it downwardly at its central point until it contacts with the adjustable anvil 71. The table is then energized for causing the work to travel past the milling cutters 32 and 33 for trimming or scalping the sides of the work adjacent thereto.

The hydraulic mechanism for actuating the several pistons consists of a supply tank or sump 79 which is fastened or bolted to the upper surface of the milling machine table 18 and which contains the hydraulic medium. The tank 79 is provided on its upper end with a shelf 80 on which is mounted an electrical motor or prime mover 81 for driving pinion 82 connected therewith. A gear 83 meshing with the pinion 82 is secured to a shaft 84 of a pump 85 which is likewise carried by the shelf 80 and consequently driven from the prime mover or motor 81. A suction pipe 86 extends from the pump 85 to or near the bottom of the sump 79 whereby an hydraulic medium, preferably oil, is drawn therefrom and forced under pressure through the pressure line or pipe 87. The pressure pipe 87 terminates at its other end in a valve casing or housing 88 inclosing the valve sleeve 89 through which the sliding valve 90 is reciprocated. The valve 90 has formed thereon the cannelures 91 and 92 for connecting the pressure source with either of cylinder pipes or conduits 93 and 94, and for connecting the remaining one of said pipes with one of the branch return conduits 95 and 96. The sliding valve 90 is provided on one end with a rack 97 meshing with a pinion 98 keyed or otherwise secured to a short vertical shaft 99. The pinion 98 is provided at one point of its periphery with an enlarged lug 100 forming on opposite sides thereof seats 101 and 102 for a spring pressed plunger 103. The spring pressed plunger 103 is guided by a boss 104 formed on housing 105 which incloses the pinion 98 and rack 97 and which housing is secured to the end of valve casing 88. The shaft 99 has secured to it exteriorly of the housing 105, a handle 106 whereby the valve is actuated.

The actuation of the valve 90 to its extreme positions first connects the hydraulic pressure in the line 87 with one end of the cylinders, for example by way of the conduit or pipe 94 with the upper end of the cylinders for actuating the pistons therein downwardly. At this time the lower end of the cylinders is connected by way of the conduit or pipe 93 with the branch exhaust or return line 95 through the cannelure 91 of the valve. When the valve is shifted to its other extreme position the cannelure 92 connects the pipe or conduit 94 from the top of the cylinders with the other branch exhaust conduit 96 while at this time the cannelure 91 is connecting the pressure from the line 87 with the lower conduit of the cylinders.

As shown in Figure 1 the bed 15 has secured near its right hand end a bracket 107 and on the end wall thereof a bracket 108. These brackets extend upwardly and terminate in parallel faces 109 and 110, respectively, which are in substantial alignment with the upper supporting faces of the fixed anvils 55 and 56. The said supporting faces 109 and 110 are of considerable length and terminate adjacent the said anvils 55 and 56 when the table is at its right hand limit of movement. In operation the work is mounted on the brackets 107 and 108 by means of a crane or other elevating mechanism and then slid onto the anvils 55 and 56.

The rear face of the bed 15 is likewise provided with a pair of brackets 111 and 112 which have pivotally mounted thereon blocks 113 and 114 respectively supporting stops 115 and 116. The stops 115 and 116 are adapted to be axially adjusted relative to the blocks by means of hand wheels or knobs 117 and 118 and are in turn adapted to be secured by means of lock nuts 119 and 120. It will be noted that the pivots 121 and 122 respectively for the blocks 113 and 114 are so positioned relative to the brackets and the axial center of the stops 115 and 116 that the said stops may be actuated in a clockwise direction as the table travels to the left as seen in Figure 1. Springs 123 and 124 are provided one for each of the blocks 113 and 114 for returning them to their normal position which is definitely determined by stops 125 and 126 respectively associated with the brackets 111 and 112.

The stops 115 and 116 are so positioned as to limit the lateral movement of the work relative to the anvils 55 and 56 and have their operative faces positioned a definite amount behind the cutter 32 so that a light cut of sufficient depth is taken from the side of the work which contacts them sufficiently to clean the said face. It will be understood that the face of the work contacting with the stops 115 and 116 may be of a considerably uneven condition so that as the work moves past the stops any projection or roughness of the work will tend to be sheared off by the stops or effect its bending whereupon blocks carrying the stops are oscillated about the pivot against the resistance of their returning springs.

The upright 39 of the work supporting frame 34 is provided with an adjustable abutment 127 which limits the axial movement of the work or billets. The abutment 127 is locked in position by means of a lock nut 128 threaded thereon. The stops 115 and 116 and abutment 127 cooperate with one another for positioning the work or billet relative to the straightening and carrying frame for proper presentation to the cutters 32 and 33.

From the foregoing it will be noted that there has been provided a milling machine for effectively straightening normally bowed or deformed billets and for holding the said billets in the straightened condition while the faces thereof are being milled. After one pair of faces have been cleaned up by the milling cutters, the table is actuated again to its right hand limit of movement whereupon the billets are rotated so that the previously finished faces are respectively opposed to the supporting anvils and clamping pistons whereupon the table is again actuated to the right for passing the remaining rough or unfinished faces past the milling cutters so that all four sides of the billets are properly cleaned or scalped prior to the rolling or drawing operation.

What is claimed is:

1. In a machine tool organization having spaced rotatable cutters, the combination of a bed, a table carried thereby between said cutters and translatable relative thereto, a frame on the table, means on the frame near opposite ends thereof lying in a given plane for supporting a work piece thereon, means on the frame beneath the plane of the work supporting members for supporting the work at its central point, and hydraulic means carried by the frame for engaging the work and holding same against the work supporting members while being operated upon by the rotating cutters.

2. In a machine tool organization having spaced rotatable cutters, the combination of a bed, a table carried thereby between said cutters and translatable relative thereto, a frame on the table, means on the frame near opposite ends thereof lying in a given plane for supporting a work piece thereon, means on the frame beneath the plane of the work supporting members for supporting the work at its central point, hydraulic means carried by the frame for engaging the work and holding same against the work supporting members while being operated upon by the rotating cutters, means supported by the bed for engagement with the work to laterally position it relative to the work supports, and means for engaging one terminus of the work to axially position same relative to the frame.

3. In a machine tool organization having spaced rotatable cutters, the combination of a bed, a table carried thereby between said cutters and translatable relative thereto, a frame on the table, means on the frame near opposite ends thereof lying in a given plane for supporting a work piece thereon, means on the frame beneath the plane of the work supporting members for supporting the work at its central point, hydraulic means carried by the frame for engaging the work and holding same against the work supporting members while being operated upon by the rotating cutters, means supported by the bed for engagement with the work to laterally position it relative to the work supports, means for engaging one terminus of the work to axially position same relative to the frame, and means pivotally supporting the lateral positioning means whereby relative movement between the lateral positioning means and work may be effected.

4. In a machine tool organization, the combination of a bed, a translatable table mounted thereon, a work supporting and straightening frame carried by the table, a rail carried by the frame, a plurality of hydraulic cylinders mounted on the rail, work supports carried by the frame beneath the hydraulic cylinders, pistons within the cylinders adapted to engage and straighten the work on the supports, means for translating the table relative to the bed, and a hydraulic pressure source carried by the table for operating the pistons in the cylinders.

5. In a machine tool organization, the combination of a bed, a translatable table mounted thereon, a work supporting and straightening frame carried by the table, a rail carried by the frame, a plurality of hydraulic cylinders mounted on the rail, work supports carried by the frame beneath the hydraulic cylinders, pistons within the cylinders adapted to engage and straighten the work on the supports, means for translating the table relative to the bed, a hydraulic pressure source carried by the table for operating the pistons in the cylinders, a valve controlling the direction of flow of the hydraulic pressure source, a handle, and a rack and pinion connection between the handle and valve whereby it may be effectively actuated.

6. In a milling machine for milling opposite sides of bowed or bent bars or the like, the combination of a bed, a table translatably supported by the bed, a column carried by the bed on each side of the table for supporting spaced cutting means, a frame on the table, mechanism carried by the frame for straightening and holding the work, means to translate the table and thereby feed the work while being held by said mechanism relative to the cutting means to effect said milling operation, said mechanism comprising anvils having a fixed height and adapted to engage the work near opposite ends in the same plane, a movable anvil intermediate the fixed anvils and adapted to engage the work at a point in the plane of the fixed anvils or at a point in a plane below the plane of the fixed anvils, and means for bending the bar at its central portion until limited by engagement with the movable anvil.

7. In a machine tool organization having spaced rotatable cutters, the combination of a bed, a table carried thereby for translation between said cutters, a frame mounted on the table, means on the frame near opposite ends thereof for receiving and supporting an upwardly bowed work piece, said means comprising anvils lying in a given plane, hydraulically actuated means carried by the frame for clamping the work against said anvils, additional hydraulically actuated means for engaging the central bowed portion of the work and exerting a downward pressure thereon to straighten the same, a stop lying midway between said anvils for limiting the downward movement of the work and thereby the amount of relative bending whereby the work will be straightened and simultaneously clamped, and means to translate the work while so clamped relative to the cutting means to machine the sides thereof.

8. In a billiet scalping machine the combination of the means for supporting and guiding a billet for relative movement with respect to a cutting means, said supporting means including a pair of spaced anvils for supporting the ends of a bowed billet, an intermediate adjustable support movable below the plane of said anvils and in a definite relation to the arc of curvature of the billet, plungers engageable with the upper surface of the billet intermediate said anvils, means for moving said plungers into engagement with the billet, said means having sufficient power to bend the billet as limited by said adjustable support to straighten the same and a control device for maintaining said means operable during movement of the billet relative to the cutting means to thereby act as a clamp during cutting.

9. In a billet scalping machine having a pair of spaced cutters the combination with a bed, of means for supporting and guiding a billet thereon for movement relative to said cutters, said means including a pair of spaced anvils for receiving and supporting a bowed billet, adjustable stops carried by the bed for engaging the sides of the billet for laterally positioning the same in alignment with said cutters, said stops being movable a predetermined amount beyond the plane of the cutters to determine the amount of material to be removed, hydraulically operable means engageable with the billet intermediate the spaced anvils for straightening the billet prior to cutting, said means also serving to clamp the billet during cutting, and means carried by the table for supplying fluid pressure to said hydraulically operable means.

WALTER D. ARCHEA.